(12) United States Patent
Bae

(10) Patent No.: US 12,204,664 B2
(45) Date of Patent: Jan. 21, 2025

(54) HIDDEN INFORMATION-BASED SECURITY SYSTEM FOR ELECTRONIC DOCUMENTS

(71) Applicant: SOFTCAMP CO., LTD., Gyeonggi-do (KR)

(72) Inventor: Hwan-Kuk Bae, Gyeonggi-do (KR)

(73) Assignee: SOFTCAMP CO., LTD., Gyeonggi-do (KR)

( * ) Notice: Subject to any disclaimer, the term of this patent is extended or adjusted under 35 U.S.C. 154(b) by 281 days.

(21) Appl. No.: 17/541,258

(22) Filed: Dec. 3, 2021

(65) Prior Publication Data
US 2022/0207166 A1  Jun. 30, 2022

(30) Foreign Application Priority Data
Dec. 30, 2020  (KR) .......... 10-2020-0187184

(51) Int. Cl.
*G06F 21/62* (2013.01)
*G06F 16/16* (2019.01)
(Continued)

(52) U.S. Cl.
CPC ........ *G06F 21/6209* (2013.01); *G06F 16/164* (2019.01); *G06F 16/1734* (2019.01); *G06F 16/1873* (2019.01); *G06F 21/602* (2013.01)

(58) Field of Classification Search
CPC .............. G06F 21/6209; G06F 16/164; G06F 16/1734; G06F 16/1873; G06F 21/602;
(Continued)

(56) References Cited

U.S. PATENT DOCUMENTS

| 7,870,614 B1 * | 1/2011 | Duhaime ............... G06F 21/602 713/192 |
| 2003/0101416 A1 * | 5/2003 | McInnes ............... G06F 40/174 715/234 |

(Continued)

FOREIGN PATENT DOCUMENTS

| KR | 20160121248 A | * 10/2016 | ............... G06K 9/00 |
| KR | 1020160121248 | 10/2016 | |

OTHER PUBLICATIONS

Raffay, Mohammad Ali. Data hiding and detection in office open XML (OOXML) documents. Diss. 2011. (Year: 2011).*

(Continued)

*Primary Examiner* — Jung W Kim
*Assistant Examiner* — Sameera Wickramasuriya
(74) *Attorney, Agent, or Firm* — IPLA P.A.

(57) ABSTRACT

A hidden information-based security system includes a security agent. The security agent includes: a hidden information module configured to search for custom.xml by analyzing the source code of electronic document data executed by an operating system-based word processor unit, and to identify authority information; a content execution module configured to control the content execution of the electronic document data by the word processor unit according to the control of a security module; and the security module configured to generate hidden information, in which a security agent-dedicated fmtID is designated, by hiding custom.xml, in which authority information for security of electronic document data is configured, at a specific location in source code of the corresponding electronic document data by using a steganographic technique, and to compare the authority information with reference information and restrict an allowable range of content.

3 Claims, 3 Drawing Sheets

(51) Int. Cl.
  *G06F 16/17* (2019.01)
  *G06F 16/18* (2019.01)
  *G06F 21/60* (2013.01)

(58) Field of Classification Search
  CPC ............ G06F 21/6227; G06F 21/6254; G06F 21/125; G06F 21/1066
  See application file for complete search history.

(56) References Cited

U.S. PATENT DOCUMENTS

| | | | | |
|---|---|---|---|---|
| 2003/0105950 A1* | 6/2003 | Hirano | ................. | G06F 21/6218 713/100 |
| 2004/0139327 A1* | 7/2004 | Brown | .................... | G06F 21/34 713/176 |
| 2006/0069733 A1* | 3/2006 | Antonoff | ............. | H04L 67/5682 709/206 |
| 2010/0263060 A1* | 10/2010 | Charbonneau | .......... | G06F 21/62 726/30 |
| 2013/0326640 A1* | 12/2013 | Nun | .................... | G06F 21/6227 726/30 |
| 2014/0007246 A1* | 1/2014 | Nelson | ................ | H04L 63/0876 726/26 |
| 2018/0131674 A1* | 5/2018 | Nelson | .................. | H04L 63/123 |
| 2022/0027486 A1* | 1/2022 | Drey | ..................... | G06F 16/168 |
| 2022/0058242 A1* | 2/2022 | Drey | ..................... | G06F 40/114 |
| 2022/0171871 A1* | 6/2022 | Zhong | .............. | G06V 30/19147 |

OTHER PUBLICATIONS

A. J. Dasare and M. L. Dhore, "Secured Approach for Hiding Data in MS Word Document Using MCDFF," 2015 International Conference on Computing Communication Control and Automation, Pune, India, 2015, pp. 296-300. (Year: 2015).*

* cited by examiner

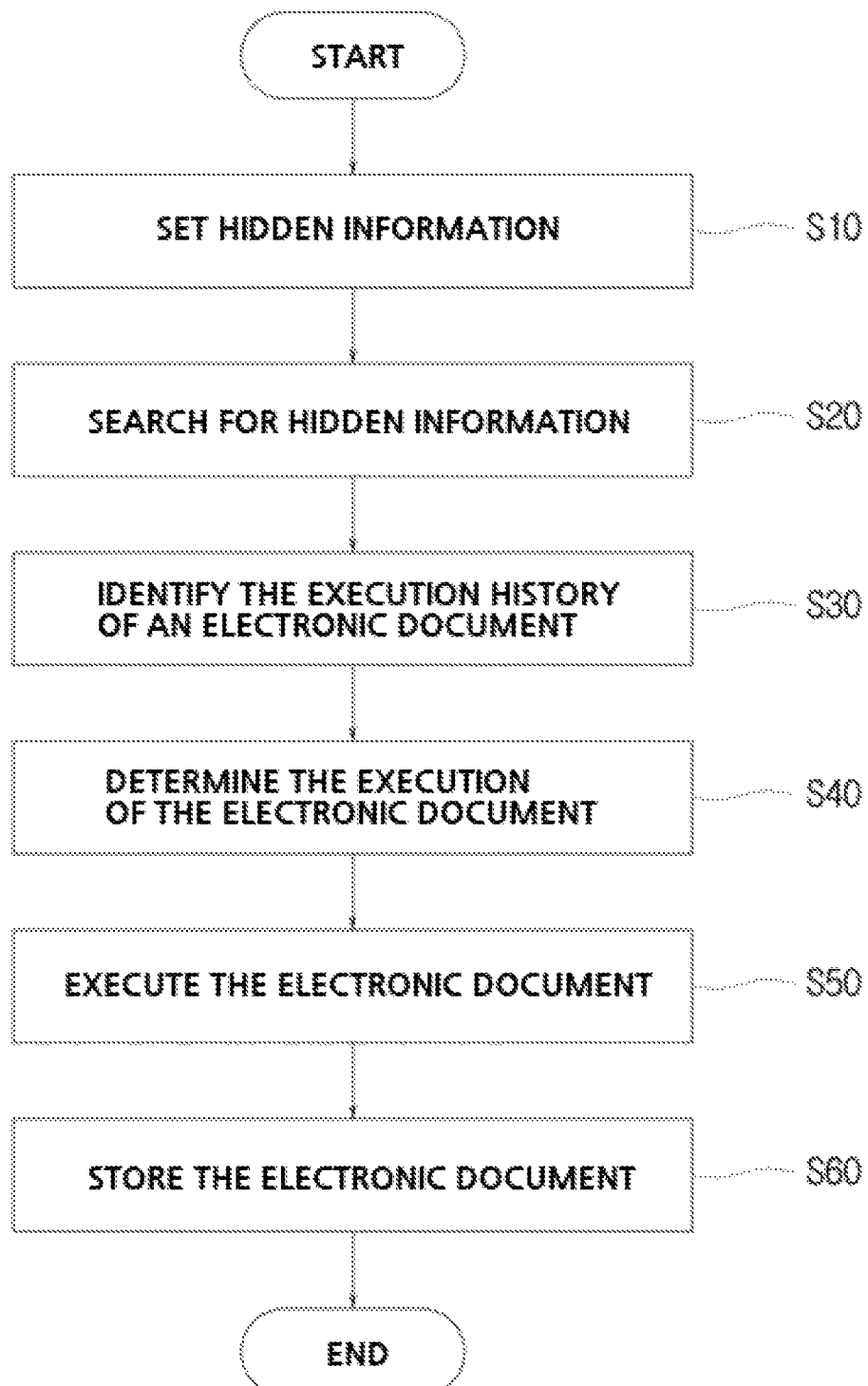

FIG. 3

THE PRECEDING PART OMITTED

```
<?xml version="1.0" encoding="UTF-8" standalone="yes"?>
<Properties xmlns="http://schemas.openxmlformats.org/officeDocument/2006/custom-properties"
xmlns:vt="http://schemas.openxmlformats.org/officeDocument/2006/docPropsVTypes">
<property fmtid="{D5CDD505-2E9C-101B-9397-08002B2CF9AE}" pid="2" name="_Version">
<vt:lpwstr>Softcamp</vt:lpwstr>
</property>
</Properties>
```

THE REST OMITTED

HIDDEN INFORMATION-BASED SECURITY SYSTEM FOR ELECTRONIC DOCUMENTS

CROSS-REFERENCE

This application claims the benefit of Korean Patent Application No. 10-2020-0187184 filed on 30 Dec. 2020 with the Korean Intellectual Property Office, which is hereby incorporated by reference herein in its entirety.

BACKGROUND

The present invention relates to a hidden information-based security system for electronic documents that can maintain a security level and log-related information even when the data of an electronic document is modified and allows a security process based on policies to be continued.

In general, in order to maintain the security of an electronic document, the login of a user to a security system that stores the electronic document is restricted, or access to the electronic document is restricted depending on a user by setting a security level for the electronic document itself. The former security scheme classifies numerous electronic documents according to the level and secures them collectively, so that it is effective in security based on the levels of electronic documents. However, this scheme has a limitation in terms of a detailed restriction on authority for each electronic document. In the latter security scheme, a detailed restriction on authority for each electronic document is possible. However, since it is necessary to set security-related access authority for each electronic document, there is a burden attributable to the security processing of a security system for each electronic document.

Therefore, the above security technologies have been used in combination depending on the security purpose of an electronic document.

Meanwhile, in order to set the security level of an electronic document itself, conventionally, the corresponding electronic document is encrypted, and a header in which a security level such as access authority and the log of an access history are recorded is additionally generated. As a result, the security system checks the header for the security level and log of the corresponding electronic document, and blocks the access of other persons to the electronic document based on the identified security level and log, thereby enhancing security.

However, when an attempt is made to read an aforementioned prior art electronic document in a legacy system that cannot recognize a header in which a security level and a log have been recorded, there is a problem in that an execution error occurs because the legacy system cannot recognize the header of the electronic document. In other words, an electronic document provided with security by a security-dedicated word program cannot be executed because an error occurs in an existing lower version word program without a security function.

Furthermore, when the header, in which the security level and the log-related information have been stored, loses its function by a malicious user, the electronic document itself may lose its security. Accordingly, the conventional security system also has a problem in that it cannot protect a corresponding electronic document and exposes security target content.

Therefore, there is a demand for a technology that can be supported and executed without an error in the legacy system even when a security level is set and enables a security system to recognize the security level of a corresponding electronic document and to restrict access authority according to a user even after decryption.

Related Art Document: Korean Patent Application Publication No. 10-2016-0121248

SUMMARY OF THE INVENTION

The present invention has been conceived to overcome the above-described problems, and an object of the present invention is to provide a hidden information-based security system for electronic documents that maintains a security level and log-related information even when the data of an electronic document is modified and allows a security process based on policies to be continued.

In order to accomplish the above object, there is provided a hidden information-based security system for electronic documents, the hidden information-based security system including a security agent, wherein the security agent includes:

a hidden information module configured to search for custom.xml, which is hidden information having fmtID (a format identifier) as the identification value thereof, by analyzing the source code of electronic document data executed by an operating system (OS)-based word processor unit, and to identify authority information;

a content execution module configured to control the content execution of the electronic document data by the word processor unit according to the control of a security module; and the security module configured to generate hidden information, in which a security agent-dedicated fmtID is designated, by hiding custom.xml, in which authority information for security of electronic document data is configured, at a specific location in the source code of the corresponding electronic document data by using a steganographic technique, and to compare the authority information identified by the hidden information module with reference information and restrict an allowable range of content.

BRIEF DESCRIPTION OF THE DRAWINGS

The above and other objects, features, and advantages of the present invention will be more clearly understood from the following detailed description taken in conjunction with the accompanying drawings, in which:

FIG. 2 is a flowchart sequentially showing the process of performing the security processing of electronic document data based on a security system, authenticating a user, and outputting the content of the electronic document data according to an embodiment of the present invention; and FIG. 3 is an image view showing an embodiment of the hidden information of electronic document data whose security processing has been performed.

DETAILED DESCRIPTION OF THE INVENTION

Figure 1:
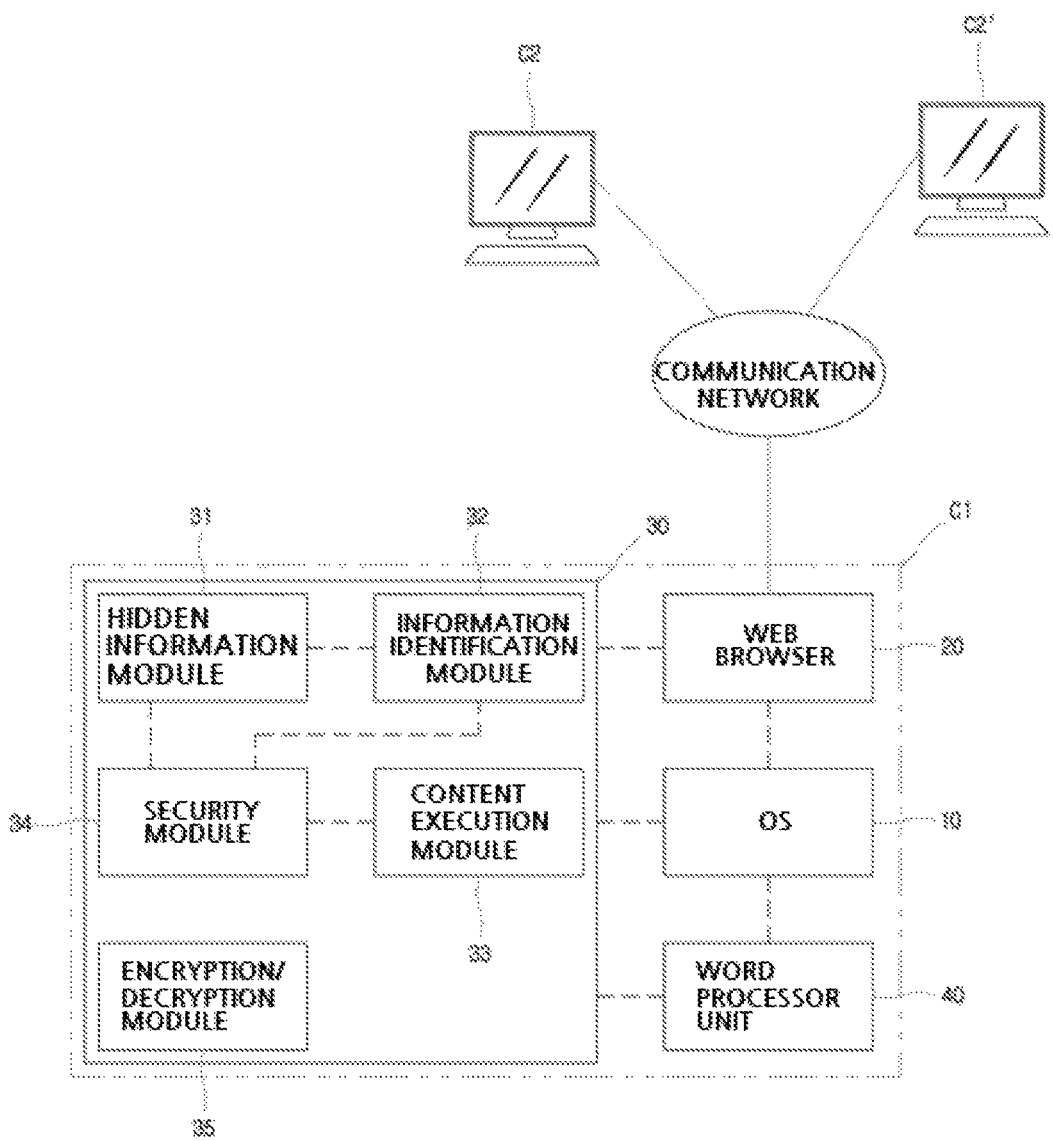
FIG. 1 is a block diagram showing a hidden information-based security system for electronic documents according to an embodiment of the present invention.

"One embodiment" or "an embodiment" is described with reference to details to be discussed below in various cases, and the accompanying drawings illustrate various embodiments. The following description and the accompanying drawings should be construed as being illustrative and should not be construed as being limitative. Numerous specific details are set forth in order to provide a thorough understanding of various embodiments of the invention. However, in specific embodiments, well-known or conventional details are not described in order to provide concise descriptions of embodiments of the present invention.

Reference to "one embodiment" or "an embodiment" herein means that a particular feature, structure, or characteristic described in conjunction with the embodiment may be included in at least one embodiment. The appearances of the phrase "in one embodiment" at various locations in the specification are not necessarily all referring to the same embodiment.

The embodiments of the present invention may include a special-purpose or general-purpose computer including various types of computer hardware, as will be described in greater detail below. FIG. 1 depicts a schematic diagram of an exemplary computing system that may be used to implement the features of the present invention, which is referred to as a "client." The described client is merely one example of such a suitable computing environment and is not intended to suggest any limitation as to the scope of use or functionality of the present invention. The present invention should not be construed as having any dependency or requirement with respect to any one or any combination of components shown in FIG. 1.

The terms to be used to describe a "hidden information-based security system for electronic documents" according to the present invention will be defined first. The "hidden information-based security system for electronic documents" according to the present invention refers to software or a device that restricts the content reading, number of readings, editing, decryption, exporting, printing, print marking, expiration date, automatic destruction, authority change, content duplication, etc. of electronic documents according to the user, the executing PC, and/or the like. The "hidden information-based security system for electronic documents" is installed on a client, and operates in conjunction with software that executes electronic documents. Hereinafter, the "hidden information-based security system for electronic documents" is referred to as the "security system."

An "electronic document" according to the present invention is standardized as data in the form of a document that is created, and transmitted and received, or stored in an electronic form by a device having information processing capability, such as a computer. The data may include content such as text, images, and graphs. As for the supported extensions of electronic document-related software for execution on a computer, versions such as doc, tin, ppt, dock, xlsx, and pptx supported by MS Office and versions such as HWP and PDF may be listed as examples. In addition, various other extensions may be listed as examples. Furthermore, a "word processor unit" refers to office software that can read, edit, or create electronic documents. A "security agent" according to the present invention refers to software that generates and inputs hidden information in an electronic document, searches for and checks the hidden information configured in the electronic document, and reads the security level and log information of the electronic document. In addition, "authority information" refers to the authority granted to a user or an executing PC in connection with the content reading, number of readings, editing, decryption, exporting, printing, print marking, expiration date, automatic destruction, authority change, content duplication, etc. of electronic documents. Accordingly, the range of use for electronic documents varies depending on who a user is and what an executing PC is.

A hidden information-based security system for electronic documents according to the present invention will be described below.

The hidden information-based security system for electronic documents according to the present invention includes: a hidden information module configured to search for custom.xml having fmtID (a format identifier) as the identification value thereof by analyzing the source code of electronic document data executed by an operating system (OS)-based word processor unit, and to check for authority information and log information configured in custom.xml; an information identification module configured to ascertain an execution history of an electronic document from the log information identified by the hidden information module, and to output the execution history; a content execution module configured to control the content execution of the electronic document by the word processor unit according to the control of a security module; and the security module configured to generate custom.xml, containing authority information for the security of an electronic document and log information about an execution history of the electronic document, in the source code of the corresponding electronic document by a steganographic technique and designate a security agent-dedicated fmtID, and to compare the authority information identified by the hidden information module and the execution history identified by the information identification module with reference information and restrict the allowable range of content. In this case, the security module may be configured to generate authorization information corresponding to an input command value.

A security system according to an embodiment of the present invention will be described below in greater detail with reference to the accompanying drawings.

FIG. 1 is a block diagram illustrating a hidden information-based security system for electronic documents according to an embodiment of the present invention.

Referring to FIG. 1, the security system according to the embodiment of the present invention includes a security agent 30, including: a hidden information module 31 configured to search for custom.xml having fmtID (a format identifier) as the identification value thereof by analyzing the source code of electronic document data executed by an OS 10-based word processor unit 40, and to check for authority information and log information configured in custom.xml; an information identification module 32 configured to ascertain an execution history of an electronic document from the log information identified by the hidden information module 31, and to output the execution history; a content execution module 33 configured to control the content execution of the electronic document by the word processor unit 40 according to a control of the security module 34; and the security module 34 configured to generate custom.xml, containing authority information for the security of an electronic document and log information about an execution history of the electronic document, at a specific location of the source code of the corresponding electronic document by a steganographic technique and designate a security agent 30-dedicated fmtID, and to compare the authority information identified by the hidden information module 31 and the execution history identified by the information identification module 32 with reference information and restrict the allowable range of content.

The hidden information module 31 searches for custom.xml having fmtID as the identification value thereof by analyzing the source code of the electronic document data executed by the OS-based word processor unit 40, and checks for authorization information and log information configured in custom.xml. As described above, since the security module 34 generates hidden information, containing authority information and log information, in an electronic document, the hidden information module 31 checks for hidden information in a custom.xml format by searching for fmtID generated as the identification value of the hidden information. Since the hidden information according to the present invention is generated via a steganographic technique, the word processor unit 40 cannot recognize the hidden information in a custom.xml format, and only the hidden information module 31 can recognize fmtID by checking for it. Meanwhile, the log information is updated during a storage process through the data duplication and name change of the electronic document. The history configured in the log information may be information such as the opening time, closing time, storage time, and storage location of the electronic document, and the ID of a current version and the ID of a previous version generated during a storage process.

The information identification module 32 ascertains an execution history of the electronic document from the log information identified by the hidden information module 31. In greater detail, as described as an example above, the history of log information configured in the hidden information may include the opening time, closing time, storage time, and storage location of the electronic document, and the ID of a current version and the ID of a previous version generated during a storage process. The information identification module 32 may determine the execution history and distribution path of the electronic document by ascertaining the history.

The content execution module 33 controls the content execution of the electronic document by the word processor unit 40 under the control of the security module 34. In greater detail, since the hidden information includes authority information for the electronic document, the range of execution of the electronic document needs to be restricted in the electronic document according to the authority information. Accordingly, when the security module 34 ascertains the authority information and designates the allowable range, the content execution module 33 forcibly restricts the execution of the electronic document to the allowable range while operating in conjunction with the word processor unit 40. In other words, when the allowable range of the electronic document is restricted only to the reading of content, the content execution module 33 forcibly stops an attempt to edit the electronic document in case of the attempt to edit the electronic document while checking for the access of the word processor unit 40 to the electronic document.

The security module 34 generates hidden information, which cannot be recognized by the word processor unit 40, in the electronic document so that only the security agent 30 can recognize it. For this purpose, the hidden information is generated and inserted at a specific location in the source code of the electronic document by a steganographic technique. The hidden information is configured in an electronic document in a custom.xml format, and fmtID (a format identifier) is set as the identification value of custom.xml. custom.xml contains authority information and log information for the corresponding electronic document, and the hidden information module 31 may be located independently at a specific location in the source code of the electronic document. As a result, the hidden information is configured in the electronic document as data that cannot be recognized or is ignored by the word processor unit 40, such as the steganographic data, and only the hidden information module 31 may check the hidden information and also read the authority information and the log information by recognizing the designated fmtID. In addition, since the hidden information configured in the electronic document is an object independent of the electronic document, the hidden information may maintain the form thereof even when the content or attributes of the electronic document are changed or the extension of the electronic document is changed, and the hidden information module 31 may identify the authority information and the log information through searching. For reference, a steganographic technique is one of the data concealment techniques, and refers to a technique for inserting data into other data or research thereto. Additionally, a cryptographic technique is a means of making the content of a message unreadable, whereas a steganographic technique hides the presence of a message itself.

Thereafter, the security module 34 compares the authority information identified by the hidden information module 31 and the execution history identified by the information identification module 32 with the reference information, and restricts the allowable range of the content. As described above, the authority information relates to the allowable range for the execution of the corresponding electronic document. Accordingly, the allowable range is identified from the authority information configured in the hidden information, and a restriction is imposed through the content execution module 33 so that the word processor unit 40 executes the corresponding electronic document only for allowed execution items.

A technique for comparing authority information and an execution history with reference information will be described again below.

Meanwhile, a client C1 in which the security agent 30 is installed may access a communication network using a web browser 20 and perform data communication with another client C2. When an electronic document for which security is set is received by the web browser 20 during the data communication, the security agent 30 searches for hidden information in the corresponding electronic document, and checks for and updates log information from the found hidden information. As described above, since the log information may include the storage time and version of the electronic document, the security module 34 reinforces the log information with the storage time and version of the corresponding electronic document when the corresponding electronic document is received and stored.

Furthermore, the security agent 30 according to the present invention further includes an encryption/decryption module 35 configured to encrypt/decrypt overall electronic document data or content under the control of the security module 34, and the security module 34 controls the encryption/decryption module 35 while operating in conjunction with the word processor unit 40. More specifically, in order to enhance the security of the electronic document, the security agent 30 may encrypt the data of the electronic document whose execution is terminated and store it in the client C1. To this end, when recognizing the process of terminating the electronic document in the word processor unit 40, the security module 34 performs control so that the encryption/decryption module 35 encrypts the electronic document data stored by the word processor unit 40. The encryption/decryption module 35 may generate and locate a temporary file whose name and extension match the name and extension of the corresponding electronic document data in the storage path of the encrypted electronic document data so that the word processor unit 40 can recognize and load the encrypted electronic document data, and the actual electronic document data containing content may be stored in the form of an encrypted file. However, the encryption procedure is only an embodiment of the present invention, and the storage process of the word processor unit 40 is performed in conjunction with the security module 34 so that the security module 34 can encrypt the electronic document data.

Thereafter, when the user attempts to execute the encrypted electronic document data through the word processor unit 40, the security module 34 recognizes the execution process of the word processor unit 40 and performs control so that the encryption/decryption module 35 decrypts the encrypted electronic document data. It will be apparent that the encryption/decryption module 35 decrypts designated data under the control of the security module 34, and when recognizing the decryption, the security module 34 allows the corresponding electronic document data to be executed by the word processor unit 40.

FIG. 2 is a flowchart sequentially showing the process of performing the security processing of electronic document data based on a security system, authenticating a user, and outputting the content of the electronic document data according to an embodiment of the present invention, and FIG. 3 is an image view showing an embodiment of the hidden information of electronic document data whose security processing has been performed.

Referring to FIGS. 1 to 3, a security system-based security method according to the present invention will be described as follows:

S10: Hidden Information Setting Step

When the word processor unit 40 generates and stores the data file of an electronic document, the security module 34 of the security agent 30 allows an author having authored the electronic document or a right holder having the right of the electronic document (hereinafter referred to as a "setter") to set the authority information of the electronic document. To this end, the security agent 30 generates a security setting menu key (not shown) in the menu of the word processor unit 40 in the form of a GUI (Graphical User Interface) or a general UI. When the setter clicks the security setting menu key, the security module 34 of the security agent 30 is executed and outputs a setting layer (not shown) in which an allowable execution range can be input.

The setter inputs an allowable execution range in the output setting layer, and the security module 34 generates authority information for the allowable execution range as hidden information according to an input command value. The hidden information is generated in a custom.xml format according to a steganographic technique, and the security module 34 is disposed at a specific location in the source code of the electronic document. In addition, in custom.xml, which is hidden information, fmtID that can be recognized by the hidden information module 31 is designated as an identification value.

The security module 34 may further include log information, containing information about the execution history of the electronic document, in the hidden information. The history configured in the log information may be information including the opening time, closing time, storage time, and storage location of the electronic document, and the ID of a current version and ID of a previous version newly generated during a storage process.

S20: Hidden Information Search Step

When the word processor unit 40 attempts to execute a specific electronic document in response to an operation of a user, the hidden information module 31 of the security agent 30 searches for the hidden information in the corresponding electronic document and checks the authority information and the log information.

When the hidden information module 31 identifies the authority information, it invokes the security module 34. In contrast, when the log information is identified, the information identification module 32 is invoked.

S30: Electronic Document Execution History Ascertainment Step

In response to the invocation of the hidden information module 31, the information identification module 32 identifies the log information of the hidden information and ascertains the execution history of the electronic document. As described above, the execution history may be information including the opening time, closing time, storage time, and storage location of the electronic document, and the ID of a current version and ID of a previous version newly generated during a storage process. The information identification module 32 may determine the execution history and distribution path of the electronic document through the history.

For reference, the execution history of the electronic document identified by the information identification module 32 may be output through a separate setting window (not shown), and the distribution path of the corresponding electronic document may be tracked through this process.

S40: Electronic Document Execution Determination Step

The security module 34 compares the authority information for the security of the electronic document and the execution history of the log information with the reference information, and restricts the allowable range of the content. More specifically, the authority information is input in the form of a security level code as the allowable range for the execution of the electronic document. In other words, when the setter sets only content reading for the electronic document as the allowable range upon security setting for the electronic document, only a security level code for content reading is set in the authority information. Meanwhile, the security module 34 stores an allowable range for each security level code as the reference information. Accordingly, the security module 34 checks the security level code set in the authority information, and identifies the allowable range set for the electronic document by searching for the allowable range of the corresponding security level code from the reference information. Thereafter, when the allowable range is identified, the security module 34 transmits related data to the content execution module 33.

In addition, the log information relates to the execution history of the electronic document. The execution history of the electronic document is compared with the reference information in which the paths of harmful URLs and harmful users have been registered, and the execution of the corresponding electronic document is restricted when the electronic document in the execution history of the electronic document has passed through a path of the reference information.

S50: Electronic Document Execution Step

The word processor unit 40 executes the corresponding electronic document in response to an operation of the user, and the content execution module 33 controlled by the security module 34 controls the execution of the corresponding electronic document while operating in conjunction with the word processor unit 40. In other words, when the allowable range of the electronic document is restricted to content reading due to the authority information, the content execution module 33 having received a signal regarding content reading from the security module 34 restricts the execution of a process so that the word processor unit 40 does not perform any function other than the content reading of the user for the electronic document.

Furthermore, when the security module 34 ascertains the execution history of the electronic document from the log information and finds a path, identical to a harmful path registered in the reference information, in the execution history, the content execution module 33 having received an execution restriction signal from the security module 34 transmits a stop signal so that the word processor unit 40 does not execute the electronic document.

S60: Electronic Document Storage Step

When recognizing the process of terminating the electronic document in the word processor unit 40, the security module 34 updates one or more selected between the authorization information and the log information configured in the hidden information, and stores them in the storage means of the corresponding client C1.

The above-described present invention provides an effect in that a security level and log-related information can be maintained even when the data of an electronic document is modified and a security process based on policies can be continued. Furthermore, the above-described present invention provides an effect in that since the hidden information of an electronic document is maintained even when the format of a data file is changed, authority information and log information for the electronic document can be continuously identified and then used for security.

As described above, although the security system according to the present invention has been described and illustrated in greater detail, it should be understood that the description and illustration are intended for convenience of description and understanding of the security system according to the present invention. The rights of the present invention should not be restrictively construed as being limited to the configurations and data storage locations of the above-described embodiments, nor should it be interpreted as being limited by using other documents against the description of the present invention. The scope of rights of the security system according to the present invention should be determined based on the attached claims.

What is claimed is:

1. A hidden information-based security system for electronic documents, the hidden information-based security system implemented within a device, and the hidden information-based security system comprising a security agent, wherein the security agent comprises:

a hidden information module in a process form configured to search for custom.xml, which is hidden information having fmtID (a format identifier) as an identification value thereof, by analyzing source code of an electronic document data file executed by a word processor unit running based on a computer operating system (OS), to identify authority information, and to run based on the computer OS;

a security module in a process form configured to generate hidden information, in which a security agent-dedicated fmtID is designated, by hiding custom.xml, in which the authority information for security of the electronic document data file is configured, at a specific location in source code of the corresponding electronic document data file by using a steganographic technique, to compare the authority information identified by the hidden information module with reference information and restrict an allowable range of content, and to run on the computer OS; and a content execution module in a process form configured to control content execution of the electronic document data file by the word processor unit according to control of the security module and to run based on the computer OS;

wherein the security module configures log information about an execution history of the electronic document data file as content of custom.xml, and the hidden information module identifies the log information from the hidden information retrieved in the electronic document data file;

wherein the security agent further comprises an information identification module in a process form configured to identify the execution history of the electronic document data file in the log information identified by the hidden information module and output information about the execution history of the electronic document data file, and to run based on the computer OS; and wherein the execution history identified by the information identification module is compared with reference information in which paths of harmful URLs or harmful users have been registered, and the execution of the corresponding electronic document data file is restricted when the electronic document data file has passed through a path of the reference information.

2. The hidden information-based security system of claim 1, wherein the security agent further comprises an encryption/decryption module in a process form configured to encrypt/decrypt the overall electronic document data file or content according to control of the security module and to run based on the computer OS;

wherein the security module controls the encryption/decryption module while operating in conjunction with the word processor unit.

3. The hidden information-based security system of claim 1, wherein the security module generates the authority information about an allowable execution range as hidden information according to an input command value.

* * * * *